(12) United States Patent
Elliott

(10) Patent No.: US 6,618,384 B1
(45) Date of Patent: Sep. 9, 2003

(54) METHOD AND SYSTEM FOR INTEGRATION OF ATM EDGE SWITCH WITH ACCESS DEVICE

(75) Inventor: Stephen Bennett Elliott, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/406,317

(22) Filed: Sep. 27, 1999

(51) Int. Cl.[7] .............................................. H04L 12/28
(52) U.S. Cl. ............... 370/396; 370/395.6; 370/395.61; 955/403; 955/428
(58) Field of Search ............................ 370/395.1, 396, 370/395.6, 395.61, 395.64, 397, 44, 442, 455, 456, 457, 338, 342, 343, 344, 345, 316; 955/403, 928

(56) References Cited

U.S. PATENT DOCUMENTS

| | | | | |
|---|---|---|---|---|
| 5,623,495 A | * | 4/1997 | Eng et al. ................... | 370/397 |
| 5,764,644 A | | 6/1998 | Miska et al. | |
| 5,896,568 A | | 4/1999 | Tseng et al. | |
| 5,905,726 A | | 5/1999 | Gupta | |
| 5,946,323 A | * | 8/1999 | Eakins et al. ................ | 370/468 |
| 6,278,697 B1 | * | 8/2001 | Brody et al. ................. | 370/310 |

OTHER PUBLICATIONS

U.S. patent application Ser. No. 09/404,515, Related Co–Pending Application, Stephen B. Elliott, filed Sep. 23, 1999.

U.S. patent application Ser. No. 09/436,008, Related Co–Pending Application, Stephen B. Elliott et al., filed Nov. 9, 1999.

U.S. patent application Ser. No. 09/414,181, Related Co–Pending Application, Stephen B. Elliott et al., filed Oct. 7, 1999.

Internet Telephony Terminology and Glossary, 1997 Internet Telephone Company, Inc., pp. 1–5, San Jose, California.

MCI, Next Generation Switch and Intelligent Network Asynchronous Transfer Mode Switched Virtual Circuit (NGS/NGIN ATM SVC) virtual Data network (Dnet), pp. 1–15, Second Draft, Jan. 28, 1998.

* cited by examiner

*Primary Examiner*—William Trost
*Assistant Examiner*—Congvan Tran
(74) *Attorney, Agent, or Firm*—John D. Crane; Bracewell & Patterson, L.L.P.

(57) ABSTRACT

An ATM edge switch incorporating wireless and wireline voice and data functions is utilized to provide an integrating point for wireless and wireline communications. Functions included in the ATM edge switch are: a voice services function for voice processing functions, element management function for real time management of resources required for call processing, a call processing function for supporting calls, a mobility manager function providing access to Home Location Register/Visitor Location Register (HLR/VLR) and a network access function to consolidate traffic to and from access devices and to interface the access devices to an ATM communications network fabric.

17 Claims, 6 Drawing Sheets

METHOD AND SYSTEM FOR INTEGRATION OF ATM EDGE SWITCH WITH ACCESS DEVICE

RELATED APPLICATIONS

The present application is related to the subject matter of the following applications: Ser. No. 09/404,515 entitled "Method and Apparatus for Providing a Mobile Switching Center Intranet Function" and filed Sep. 23, 1999; Ser. No. 09/436,008 entitled "Method and System for Providing an Integrated Functional Topology for Wireless and Wireline Communication Networks" and filed Nov. 9, 1999; Ser. No. 09/414,181 "Method and System for Next Generation Wireless Network Access Function". The content of the above-referenced applications is incorporated herein by reference.

TECHNICAL FIELD

The present invention relates in general to telecommunication systems and in particular to Asynchronous Transfer Mode (ATM) communications. More particularly, the present invention relates to integration of wireless and wireline communications.

BACKGROUND OF THE INVENTION

Telecommunications systems have traditionally been split between wireless (radio) and wireline (circuit). The wireline system is generally land-based utilizing wire and microwave to route calls while wireless systems use multiple air link protocols such as Code Division Multiple Access (CDMA), Time Division Multiple Access (TDMA) and Global System for Mobile Communications (GSM) to route calls.

Traditional wireline and wireless operators are merging. The telecommunications market is changing in the form of redefined markets and redefined competitors. Operators attempting to combine wireless and wireline systems within a single network to provide service to both systems find that merging the two technologies is difficult. With multiple wireless protocols in use with wireless communication devices, associating or linking a wireless (digital signal) device with a wireline (analog or digital signal) device becomes problematic. Additionally, both types of operators are facing an explosion in demand for communications bandwidth.

A problem associated with such telephone communication networks is the inability for network operators to successfully integrate wireless and wireline access infrastructures present within such communication networks. Presently, wireless and wireline networks are distinct and defined by the switching system on which they are based and structurally less flexible than they should be. Wireless and wireline infrastructures are largely separate and those communication networks which incorporate aspects of both wireless and wireline networks often face difficult switching choices. In such communication networks, switch centric dependencies are evident. What is needed to create a truly integrated wireless/wireline network is a topology that supports a generic infrastructure independent of switching and access technologies. Such infrastructures presently do not exist and without a smooth switching infrastructure in place, such systems are largely expensive and inefficient.

Connection to a wireless system is common, but the current method of connection is switch centric and the bandwidth availability is limited. It would be desirable therefore, to provide a system that would reduce or eliminate the dependency on specific switching system technology. It would also be desirable to make accessible an expanded availability of bandwidth.

SUMMARY OF THE INVENTION

It is therefore one object of the present invention to provide a method and system to reduce or eliminate the dependency on specific switching system in support of either wireless or wireline systems.

It is another object of the present invention to provide a method and system that will flexibly support variable bandwidth.

It is yet another object of the present invention to provide a method and system that are capable of flexibly supporting multiple forms of access for all wireless and wireline communications.

The foregoing objects are achieved as is now described. An ATM edge switch incorporating wireless and wireline voice and data processing and conversion functions is utilized to provide an integrating point for wireless and wireline communications. Functions included in the ATM edge switch are: a voice services function for voice processing functions, element management function for real time management of resources required for call processing, a call processing function for supporting calls, a mobility manager function providing access to Home Location Register/Visitor Location Register (HLR/VLR) and a network access function to consolidate traffic to and from access devices and to interface the access devices to an ATM network switching fabric (physical/logical communications channels from port to port).

The above as well as additional objects, features, and advantages of the present invention will become apparent in the following detailed written description.

BRIEF DESCRIPTION OF THE DRAWINGS

The novel features believed characteristically of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
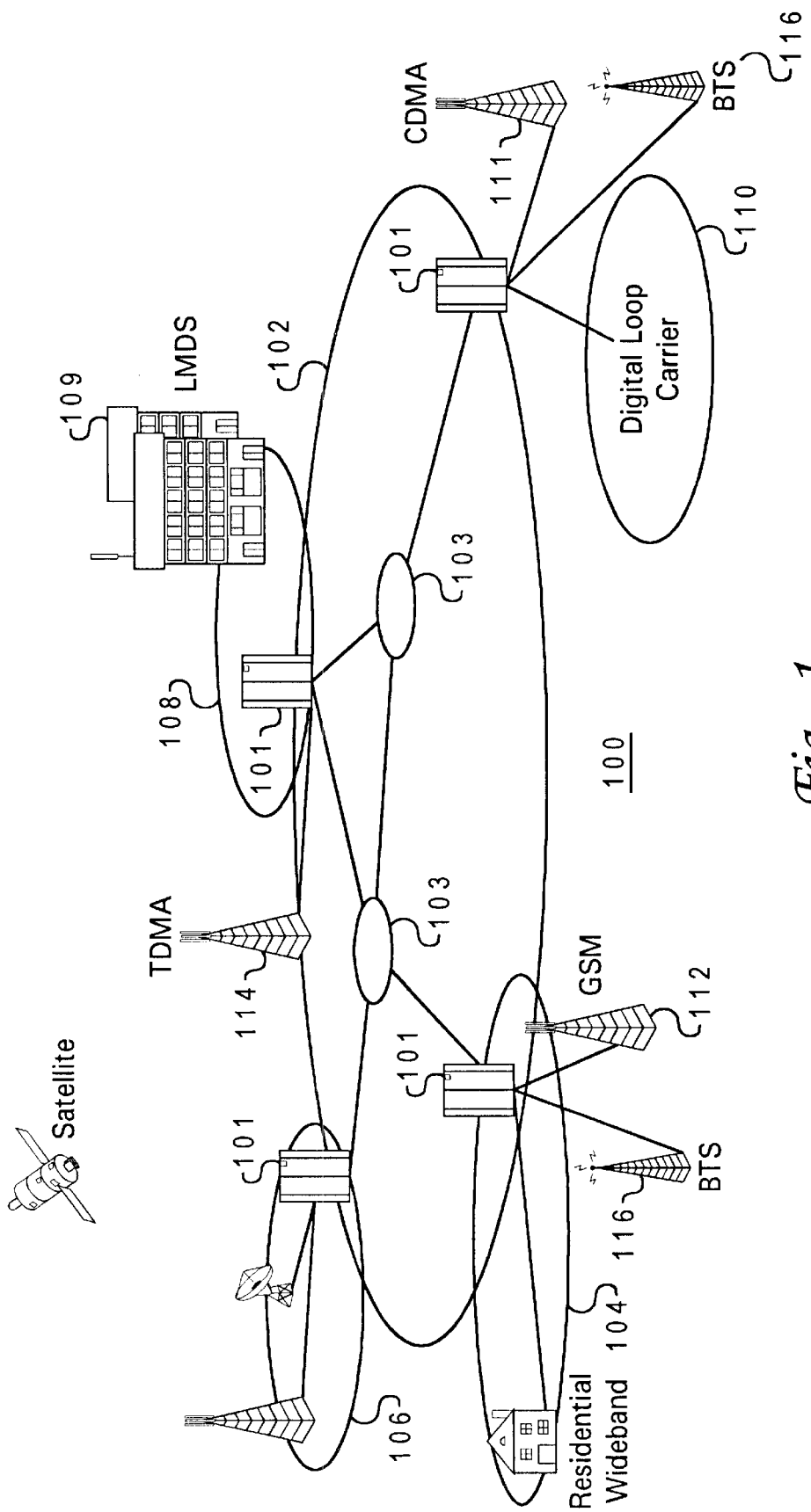
FIG. 1 depicts a high-level block diagram of an integrated communications network in which a preferred embodiment of the present invention may be implemented.

With reference now to the figures, and in particular with reference to FIG. 1, a high-level block diagram of an integrated communications network in which a preferred embodiment of the present invention may be implemented is depicted. Communications network 100 is depicted utilizing ATM network 102 as a medium with which to transmit communications traffic between sending and receiving devices. Communications network 100 includes Integrated Edge Switch Access (IESA) device 101, residential wideband 104 (i.e., fiber optic cable), BTS 116, Digital Loop Carriers (DLC) 110, GSM 112, CDMA 111, TDMA 114, Local Multipoint Distribution System (LMDS) 108 and satellite transmission and reception devices 106. Within communications network 100, IESA device 101 provides transmission and reception between devices having different protocols. The shelf configuration within IESA device 101, as explained in FIG. 2, utilizes multiple interfaces and control and conversion systems to provide communication between devices having disparate communications protocols. Communication between remote devices is accomplished via ATM network 102 and ATM core switches 103, across which multiple transmissions may simultaneously take place involving many different protocols and various bandwidths.

Voice and data communication via ATM involves creating a virtual circuit between the parties involved. The circuit exists only as long as the parties remain connected. ATM is capable of carrying virtually any form of digital data and is not limited to computer data as digital audio/voice and video applications are also being transferred via ATM. All the cells in a transmission follow the same path as determined during a call setup. Since there are no fixed time slots in ATM, a transmission may use any empty cell whenever one is available.

Figure 5:
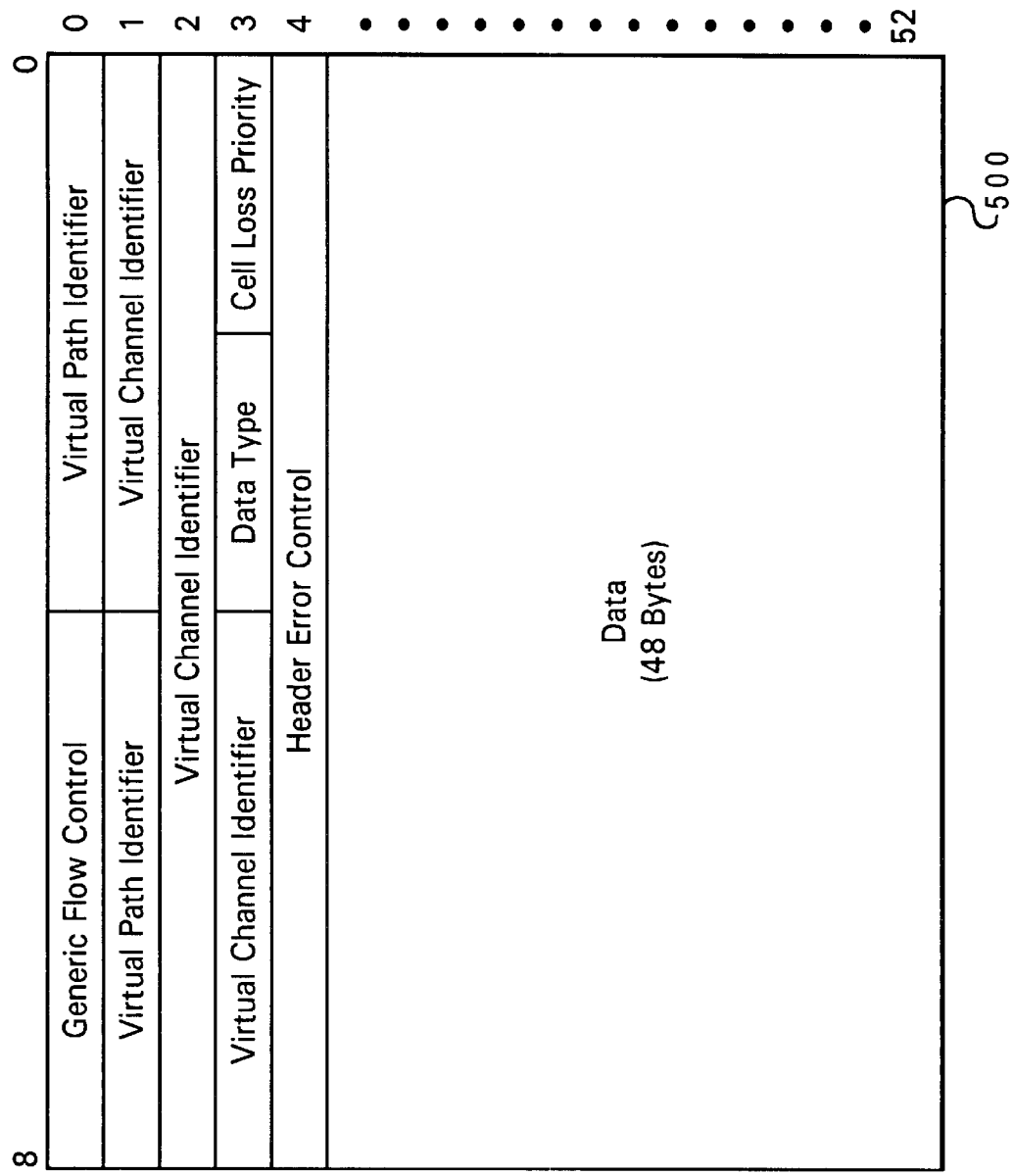
FIG. 5 illustrates a diagram of the configuration of an ATM cell in accordance with a preferred embodiment of the present invention.

Referring now to FIG. 5, a block diagram of an ATM cell in accordance with a preferred embodiment of the present invention is depicted. ATM communication is based on small cells of data, permitting various forms of data traffic that can be multiplexed together. Each cell is 53 bytes long including five bytes for a cell header. As shown, ATM cell 500, has a 48-byte field reserved for data. Data in an ATM cell can be any type, if it can be digitally encoded, and includes IP packets, Pulse Code Modulation (PCM), digital voice, Ethernet, video, etc. ATM cell 500 has a five-byte header that provides flow control, identifies the virtual path, virtual channel and type of data, and provides header error control. The information payload (data) is contained in the 48-byte ATM automatically adjusts the network capacity to meet system needs and allocates bandwidth on demand and is capable of high speed connections for voice, data and video.

Data transfer rate (bandwidth) for ATM communications is wideband and scalable according to physical resource availability or provider control. Different speed connections may be made depending on the type of applications needed. ATM is independent of actual physical interconnection which makes ATM ideal for connecting networks of different media types. Bandwidth (width of a communications channel—in analog communications measured in hertz (Hz) and measured in bits per second (bps) in digital communications) for each type of data is available on demand. Voice transmission, typically carried in a 4000-Hz analog channel, may also be encoded in Pulse Code Modulation (PCM) format (64,000 bits per second) for carriage in digital communications. If a bandwidth is required for data bursts in ATM, with ATM's bandwidth capability, a request by the application is all that is needed (providing a bandwidth is available).

Figure 2:
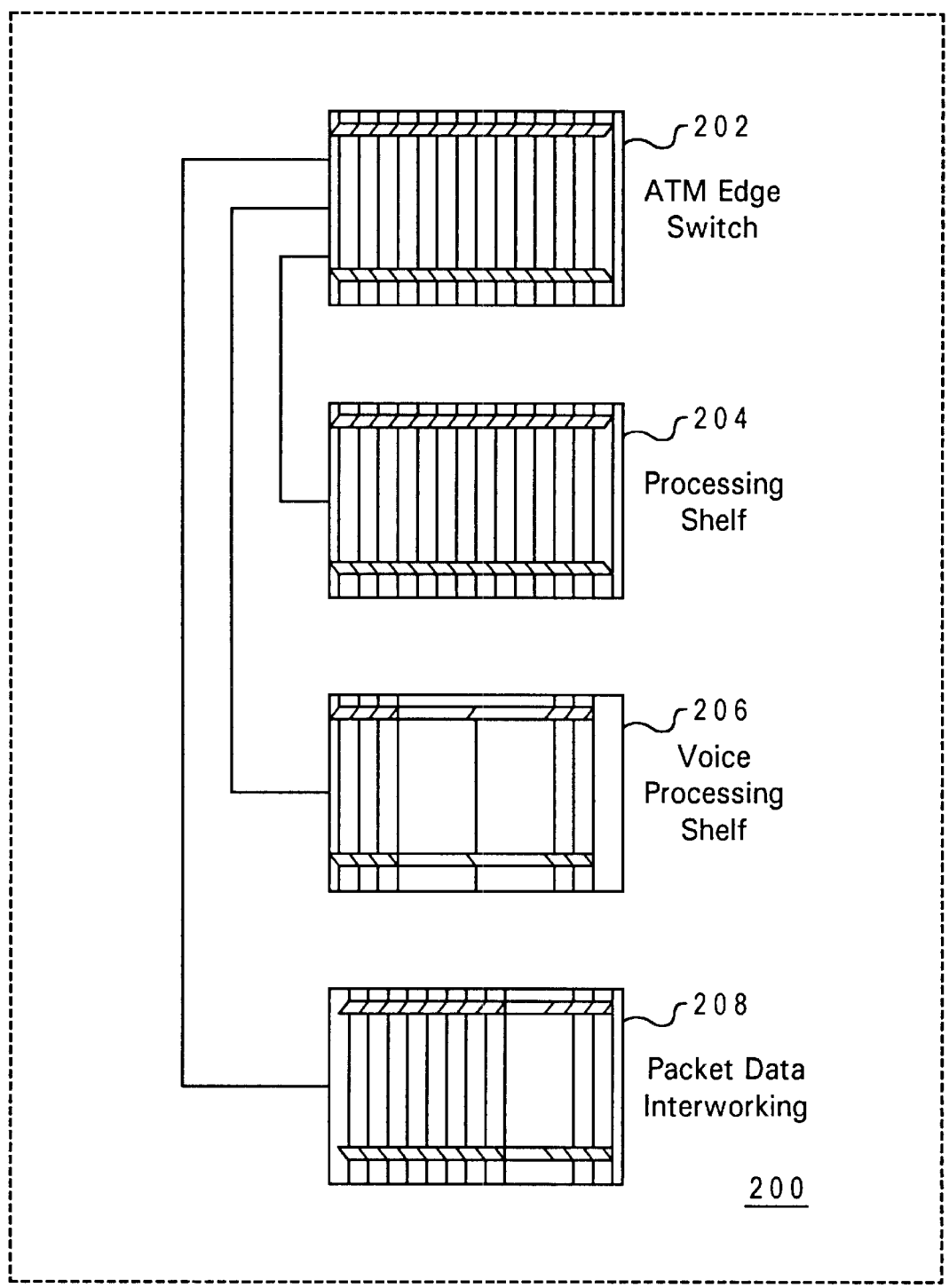
FIG. 2 depicts a high-level block diagram of an integrated edge switch access system in accordance with a preferred embodiment of the present invention.

Referring now to FIG. 2, a high-level block diagram of an Integrated Edge Switch Access device in accordance with a preferred embodiment of the present invention is illustrated. Integrated Edge Switch Access (IESA) device 200 (also depicted in FIG. 1 as IESA Device 101) is shown in a multi-shelf configuration indicating the portions of IESA device 200 that are of particular importance to the present invention. ATM edge switch 202 is a standard ATM edge switch shelf. ATM edge switch 202 is used as a master Local Area Network (LAN) subtending other shelves in IESA device 200. ATM edge switch 202 is a director of communications acting as an interface for all other related functions in ESA device 200. An ATM interface provides a circuit switched Mobile Switching Center access to the ATM packet Network as well as a data path to each IESA device.

Processing shelf 204 contains one pair of Wireless Shelf Processors (not shown). The balance of the shelf (typically 12 slots) is equipped with paired Wireless Application processors (not shown) and may be logically associated with any of IESA device 200 functions. Processing shelf 204 provides detailed call control and processing, handoff processing and device management for each cell site in the wireless network.

Voice processing shelf 206 provides transcoding functions and Public Switched Telephone Network trunk interfacing. Additionally, voice processing shelf 206 contains two Digital Signal Processing (DSP) modules and two Optical Carrier 3 (OC3) cards (containing three OC3 links on each card). An OC3 link is a fiber optic transmission standard and is line rated at 155.52 mbps (million bits per second). Voice processing shelf 206 is capable of supporting voice interworking with wireless protocols, such at Time Division Multiple Access to Code Division Multiple Access, through the use of data selector cards. A Trunking Interface Node provides PSTN access to the wireless network, transcoding of speech samples and management of DSP resources.

Packet data interworking shelf 208 is equipped with Wireless Application Processors, a Digital Signal Processing Module and Public Data Network (PDN) trunk interfaces (OC3). The packet data interworking shelf 208 combines communications data interworking in the wireless network.

Figure 3A:
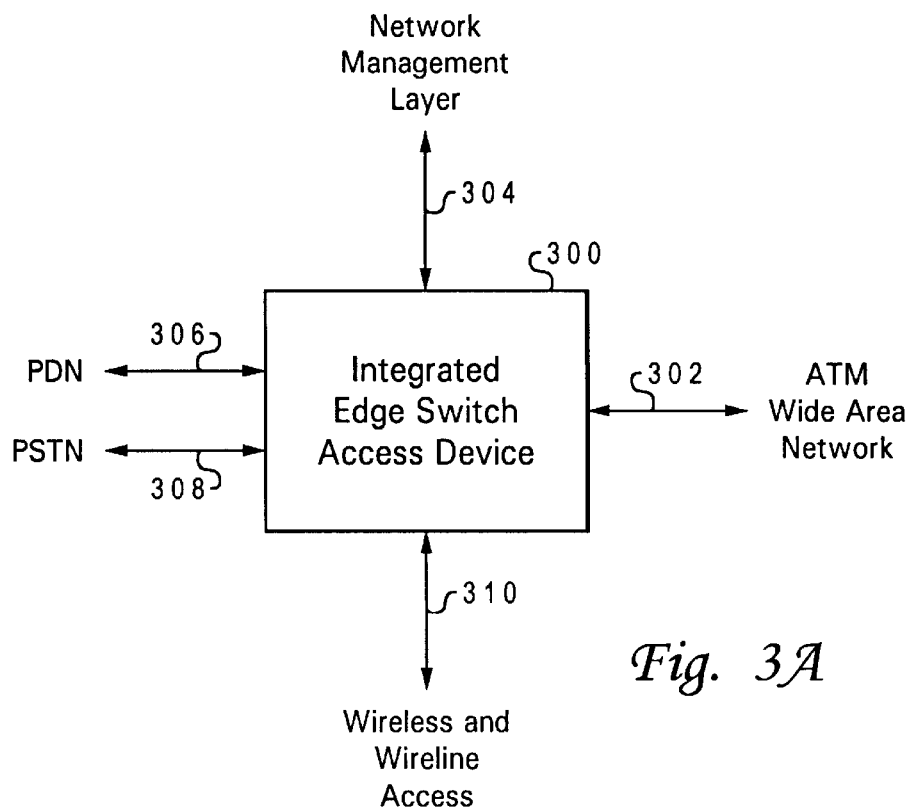
FIG. 3A illustrates a high-level block diagram of an integrated ATM edge switch access system in accordance with the present invention.

Referring now to FIG. 3A a high-level block diagram of an Integrated Edge Switch Access device in accordance with the present invention, is illustrated. The IESA device 300 supports five principal interfaces. A first interface 302 links IESA device 300 to ATM Metropolitan Area Network (MAN) or ATM Wide Area Network (WAN). Interface 304 provides a functional interface to the ATM network management layer. Interface 306 is the physical connection to the Public Data Network (PDN). Interface 308 connects the IESA device to the Public Switched Telephone Network (PSTN). Various wireless and wire-line devices, including base-transceiver stations (BTS) and digital loop carriers (DLCs), access the system via Interface 310.

Figure 3B:
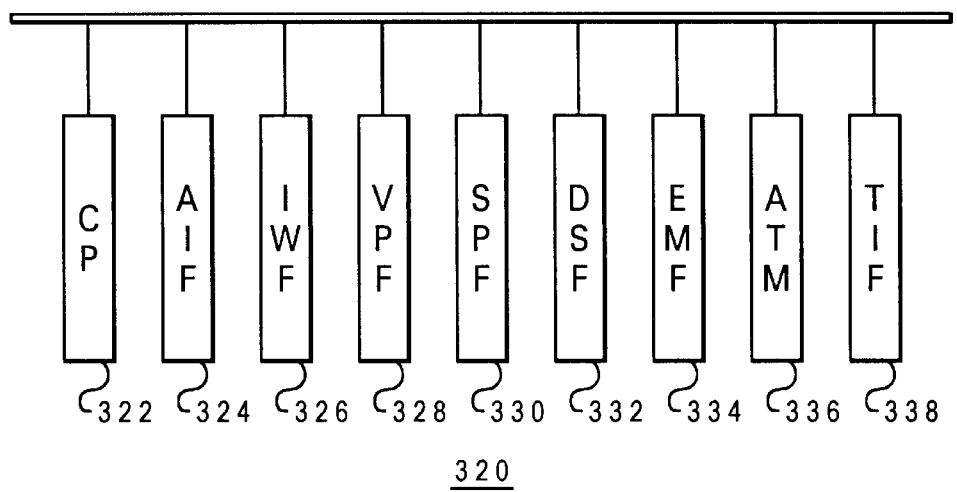
FIG. 3B depicts a high-level block diagram of a functional partitioning of the integrated ATM edge switch access system in accordance with the present invention.

Referring now to FIG. 3B, a high-level block diagram of a functional partitioning of the integrated ATM edge switch-access system in accordance with the present invention, is depicted. IESA device 320 is shown including functional components of the system. Control processor (CP) 322, provides general purpose processing for IESA device 320 including overall coordination of hardware and software subsystems. Additionally, CP 322 controls call processes associated with wireless and wire-line communication devices. Access Interface (AIF) 324 provides various electrical and software interfaces in support of wireless and wire-line access devices including wireless base-transceiver stations and wire-line digital loop carriers.

Inter-working Function (IWF) 326 provides an Internet Protocol (IP) gateway functionality required for interfacing wireless or wire-line subscribers to the Public Data Network. Specifically, this involves converting from Time Division Multiplex information format to IP format. Voice Processing Function 328 provides digital signal processing resources specifically associated with transcoding and echo cancellation of voice signals from various wireless or wire-line coded formats. The signals transmitted as compressed and non-compressed formats across the ATM network, the public data network and the Public Switched Telephone Network.

Signal Processing Function 310 provides real time processing of stimulus and functional signaling associated with wireless and wire-line terminal devices as well as trunk signaling associated with PSTN connections. Digital Signal Function (DSF) 332 provides time division switching and multiplexing at Digital Signal Zero (DS-0), sub DS-0 and at N×DS-0 rates for transmission from and to various networks and access devices. Element Management Function (EMF) 334 is a processing resource dedicated to real time element management of the IESA device. It further supports the functional interface to the Network Management Layer (NML)(not shown). Asynchronous Transfer Mode interface 336 provides wide area networking functionality associated with ATM edge switch devices. Trunk Interface (TIF) 338 provides physical and software interfacing with PSTN trunks.

Figure 3C:
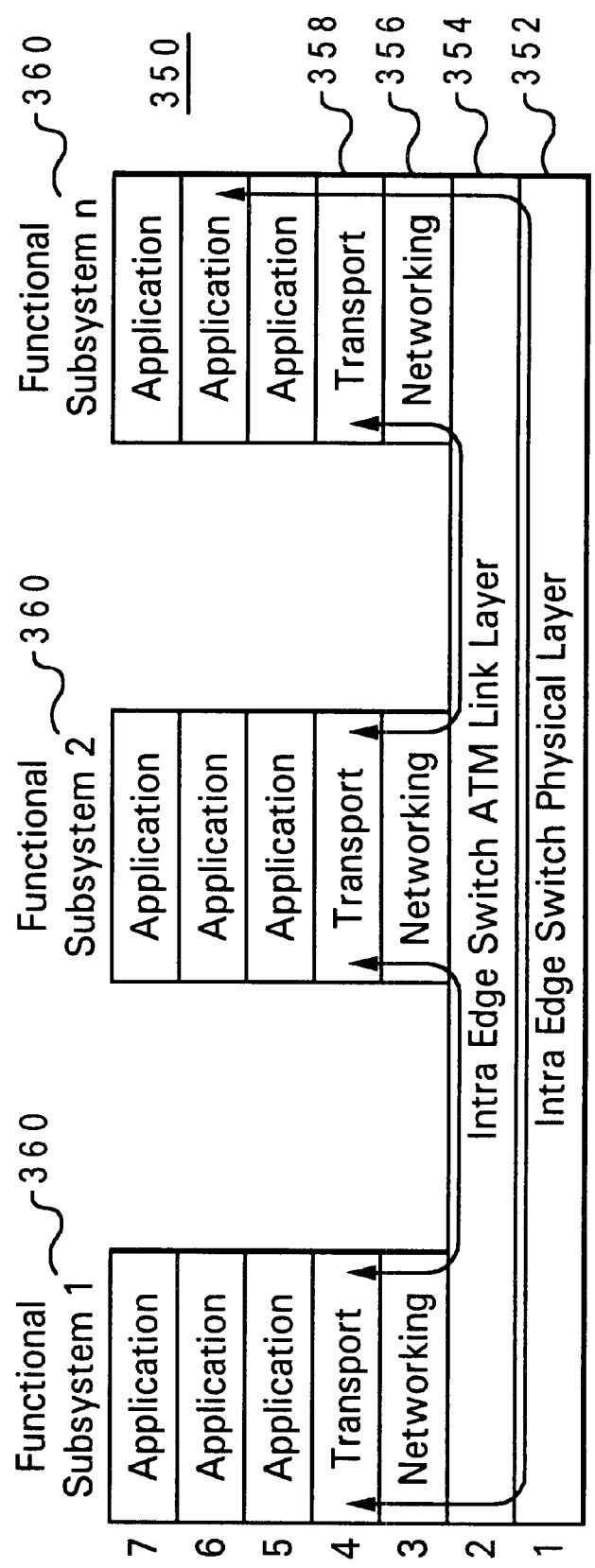
FIG. 3C depicts the link layer infrastructure utilized within an ATM network.

Referring to FIG. 3C, a high-level block diagram of a link layer infrastructure of an ATM communications system in accordance with the present invention, is depicted. Permanent virtual circuits provide an intra-system network linking every functional subsystem to every other functional subsystem. Physical layer 352 is layer one in the ATM network management hierarchy and includes all the electrical and mechanical aspects relating to the connection of a device to a transmission medium, e.g., ATM network fabric. ATM Link Layer 354 provides cell multiplexing, header creation, flow control and selection of Virtual Path Identifiers. Networking layer 356 routes data messages through the network. Transport layer 358 defines the rules for information exchange and manages end-to-end delivery of data (packets). Application layer 358 provides for particular application services such as virtual terminals, file transfer, remote file access, etc. Functional Subsystem 360 1, 2, . . . n depict Integrated Edge Switch Access devices.

Figure 4:
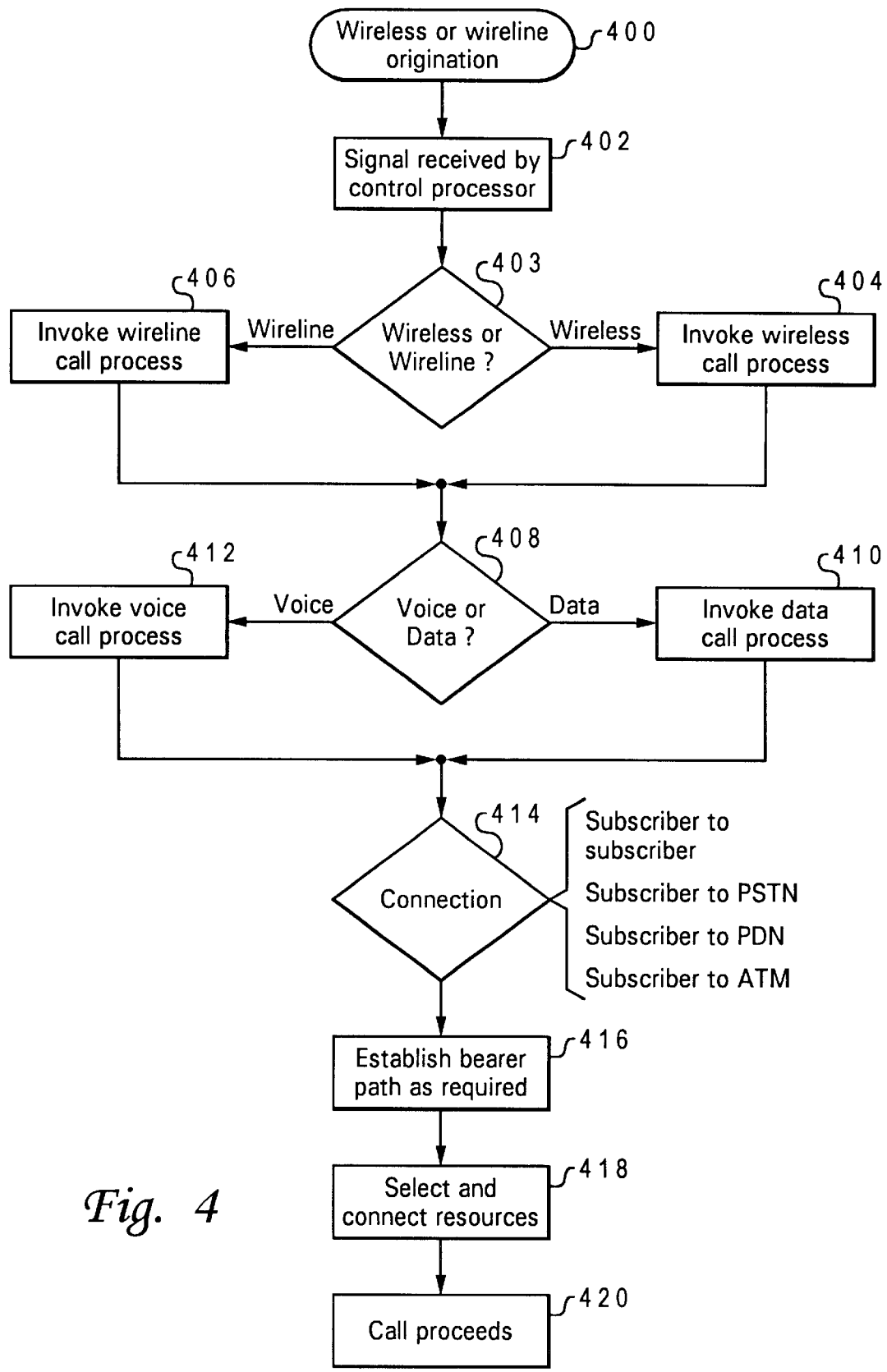
FIG. 4 illustrates a high-level flow diagram of a method for integrating wireless and wireline utilizing an integrated ATM edge switch system in accordance with a preferred embodiment of the present invention.

Referring to FIG. 4, a high-level flow diagram of a method for utilizing an Integrated Edge Switch Access device to integrate wireless and wireline communication signals in accordance with a preferred embodiment of the present invention is illustrated. The process begins with step 400, which depicts a wireless or wireline signal being transmitted to a base station. The process continues to step 402, which illustrates the received signal being passed to the incoming signal control processor. The process then passes to step 403, which depicts a determination of whether the signal is a wireless signal or a wireline signal. If the signal is a wireless signal, the process proceeds to step 404, which illustrates the ESA device invoking the wireless call process. If the signal is a wireline signal, the process proceeds instead to step 406, which depicts the IESA device invoking a wireline call process.

Regardless of whether the signal is wireline or wireless, the process then proceeds, from either 404 or 406 to step 408, which illustrates a determination of whether the signal is a voice signal or a data signal. If the signal is a data signal, the process passes to step 410, which depicts the IESA device invoking a data call process. If the signal is a voice signal, the process passes instead to step 412, which illustrates the IESA device invoking a voice call process.

The signal continues, from either step 410 or 412 to step 414, which illustrates determining which type of connection will be completed and that depends on the target device. As shown in FIG. 4, connection 414 determines whether the subscriber will connect to another subscriber with the same protocol, connect to the Public Switched Telephone Network, connect to the Public Data Network or connect to an Asynchronous Transfer Medium network. The process then passes to step 416, which depicts the IESA devices establishing the connections between the devices as required. The process continues to step 418, which depicts the IESA device selecting and connecting the devices utilizing the conversion resources available in the IESA device. The process moves on to step 420, which depicts the initiated call proceeding as planned.

The IESA device provides an integrated voice and data network node supporting both wireless and wireline communications. Network connections are supported where wireless and wireline connectivity is maintained with a local PSTN, local PDN points of presence, ATM wide area networks and additionally, the local PSTN connectivity is maintained with the ATM network.

Any communications signal, wireless or wireline, may be received into an IESA device containing the present invention. The signal is then sent either directly to a target device (if the target device is on the same edge switch and is a compatible receiving device to the sending device) or after processing and converting, transmitted onto the ATM network, as ATM cells, to a receiving Integrated Edge Switch Access device. If the receiving device, compatible or not, is associated with the same IESA device as the transmitting device, receives the transmitted signal without going onto the network fabric. If the receiving device is associated with a different IESA device, the signal is converted (to ATM cells), transmitted onto the ATM network fabric, received by a second IESA device and processed and converted for the receiving device.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A system for incorporating both wireless voice and data capability with wireline voice and data capability into a telecommunications network, said system comprising:

customer premises equipment;

an Asynchronous Transfer Mode switching fabric within said network for delivering communications signals between a first communications device and a second communications device;

at least one integrated edge switch access device connected to said Asynchronous Transfer Mode switching fabric, said edge switch access device comprising:
a plurality of data and voice signal processing functions for processing communications signals, said data and voice signal processing functions comprising:
a signal processing function for pre-processing incoming and outgoing signals;
an access interface function for interfacing with said Asynchronous Transfer Mode network;
a trunk interface function for interfacing Public Switched Telephone Network with a connected wireless network;
a Digital Service Level Zero function for converting analog signals to Pulse Code Modulation signals; and
an element management function for controlling and managing network Operations Administration and Maintenance functions;
a plurality of conversion functions for converting said communications signals; and
a call processing function in said integrated edge switch access device for controlling said processing and said conversion functions.

2. The system of claim 1, wherein said plurality of voice and signal processing functions for converting a plurality of communications protocols, further comprises:
a voice processing function for transcoding a plurality of communications protocols; and
an interworking function for processing said plurality of communications protocols.

3. The system of claim 2, wherein said interworking function for processing a plurality of communications protocols further comprises:
a Code Division Multiple Access protocol stack for receiving a Code Division Multiple Access protocol signal;
a Time Division Multiple Access protocol stack for receiving a Time Division Multiple Access protocol signal;
data selector cards within said interworking function for processing said protocol stacks; and
logic for operating said data selector cards.

4. A method for incorporating wireless voice and data capability with wireline voice and data capability in a telecommunications network containing customer premises equipment, said method comprising the steps of:
in said telecommunications network, receiving a signal from an originating communications device;
responsive to said signal, utilizing an integrated edge switch access device for processing said signal and for transmitting said signal to a target communications device by:
utilizing a signal processing function for pre-processing incoming and outgoing signals;
utilizing an access interface function for interfacing said integrated edge switch access device with said Asynchronous Transfer Mode network fabric;
providing a trunk interface function for interfacing a Public Switched Telephone Network with a wireless communications network;
converting analog signals to Pulse code Modulation signals with a Digital Service-Level Zero function; and controlling and managing network Operations, Administration and Maintenance functions with an element management function;
determining whether said target communications device utilizes a communication protocol identical to a communication protocol of said originating device;
utilizing a plurality of voice and signal processing functions and conversion functions within said integrated edge switch device to process and convert said signal from said originating communications device; and
utilizing an Asynchronous Transfer Mode network fabric to transmit said processed and converted signal to said target communications device.

5. The method of claim 4, wherein utilizing said plurality of voice and signal processing functions and conversion functions within said integrated edge switch device to process and convert said signal from said originating communications device, said method further comprising:
providing a voice processing function for transcoding a plurality of communications protocols; and
providing an interworking function for processing said plurality of communications protocols.

6. The method of claim 5, wherein providing said interworking function for processing said plurality of communications protocols further comprises:
providing a Code Division Multiple Access protocol stack for receiving a Code Division Multiple Access protocol signal;
providing a Time Division Multiple Access protocol stack for receiving a Time Division Multiple Access protocol signal; and
providing data selector cards within said within said interworking function for processing said protocol stacks.

7. A switch for incorporating wireless voice and data signals and wireline voice and data signals into a telecommunications network containing customer premises equipment, said switch comprising:
at least one integrated edge switch access device connected to an Asynchronous Transfer Mode switching fabric within said telecommunications network, comprising:
a plurality of data and voice signal processing functions for processing communications signals comprising:
a signal processing function for pre-processing incoming and outgoing signals;
an access interface function for interfacing with said Asynchronous Transfer Mode network;
a trunk interface function for interfacing Public Switched Telephone Network with a connected wireless network;
a Digital Service Level Zero function for converting analog signals to Pulse Code Modulation signals; and
an element management function for controlling and managing network Operations Administration and Maintenance functions;
a plurality of conversion functions for converting said communications signals; and
a call processing function in said integrated edge switch access device for controlling said processing and said conversion functions.

8. The switch of claim 7, wherein said plurality of voice and signal processing functions for converting a plurality of communications protocols, further comprises:
a voice processing function for transcoding a plurality of communications protocols; and an interworking function for processing said plurality of communications protocols.

9. The switch of claim 8, wherein said interworking function for processing a plurality of communications protocols, further comprises:
   a Code Division Multiple Access protocol stack for receiving a Code Division Multiple Access protocol signal;
   a Time Division Multiple Access protocol stack for receiving a Time Division Multiple Access protocol signal;
   data selector cards within said interworking function for processing said protocol stacks; and
   logic for operating said data selector cards.

10. A program of instructions, within instruction bearing media associated with a telecommunication system for incorporating wireless voice and data capability with wireline voice and data capability in a telecommunications network containing customer premises equipment, comprising the steps of:
   instructions within said instruction bearing media for receiving a signal from an originating communications device in said telecommunications network;
   responsive to said signal, instructions within said instruction bearing media for utilizing an integrated edge switch access device for processing said signal and for transmitting said signal to a target communications device;
   instructions within said instruction bearing media for determining whether said target communications device utilizes a communication protocol identical to a communication protocol of said originating device;
   instructions within said instruction bearing media for utilizing a plurality of voice and signal processing functions and conversion functions within said integrated edge switch device to process and convert said signal from said originating communications device; and
   instructions within said instruction bearing media for utilizing an Asynchronous Transfer Mode network fabric to transmit said processed and converted signal to said target communications device.

11. The program of instructions of claim 10, wherein utilizing said integrated edge switch access device for processing said signal and for transmitting said signal to a target communications device, further comprises:
   instructions within said instruction bearing media for utilizing a signal processing function for pre-processing incoming and outgoing signals;
   instructions within said instruction bearing media for utilizing an access interface function for interfacing said integrated edge switch access device with said Asynchronous Transfer Mode network fabric;
   instructions within said instruction bearing media for providing a trunk interface function for interfacing a Public Switched Telephone Network with a wireless communications network;
   instructions within said instruction bearing media for converting analog signals to Pulse code Modulation signals with a Digital Service-Level Zero function; and
   instructions within said instruction bearing media for controlling and managing network Operations, Administration and Maintenance functions with an element management function.

12. The program of instructions of claim 1, wherein utilizing said plurality of voice and signal processing functions and conversion functions within said integrated edge switch device to process and convert said signal from said originating communications device, further comprises:
   instructions within said instruction bearing media for providing a voice processing function for transcoding a plurality of communications protocols; and
   instructions within said instruction bearing media for providing an interworking function for processing said plurality of communications protocols.

13. The program of instructions of claim 12, wherein providing said interworking function for processing said plurality of communications protocols, further comprises:
   instructions within said instruction bearing media for providing a Code Division Multiple Access protocol stack for receiving a Code Division Multiple Access protocol signal;
   instructions within said instruction bearing media for providing a Time Division Multiple Access protocol stack for receiving a Time Division Multiple Access protocol signal; and
   instructions within said instruction bearing media for providing data selector cards within said within said interworking function for processing said protocol stacks.

14. A telecommunication system for incorporating wireless voice and data capability with wireline voice and data capability in a telecommunications network containing customer premises equipment, said system comprising:
   means for receiving a signal from an originating communications device in said telecommunications network;
   means, responsive to said signal, for utilizing an integrated edge switch access device for processing said signal and for transmitting said signal to a target communications device;
   means for determining whether said target communications device utilizes a communication protocol identical to a communication protocol of said originating device;
   means for utilizing a plurality of voice and signal processing functions and conversion functions within said integrated edge switch device to process and convert said signal from said originating communications device; and
   means for utilizing an Asynchronous Transfer Mode network fabric to transmit said processed and converted signal to said target communications device.

15. The system of claim 14, wherein said means for utilizing said integrated edge switch access device for processing said signal and for transmitting said signal to a target communications device further comprises:
   means for utilizing a signal processing function for pre-processing incoming and outgoing signals;
   means for utilizing an access interface function for interfacing said integrated edge switch access device with said Asynchronous Transfer Mode network fabric;
   means for providing a trunk interface function for interfacing a Public Switched Telephone Network with a wireless communications network;
   means for converting analog signals to Pulse code Modulation signals with a Digital Service Level Zero function; and means for controlling and managing network Operations, Administration and Maintenance functions with an element management function.

16. The system of claim 15, wherein said means for utilizing said plurality of voice and signal processing functions and conversion functions within said integrated edge switch device to process and convert said signal from said originating communications device further comprises:

means for providing a voice processing function for transcoding a plurality of communications protocols; and means for providing an interworking function for processing said plurality of communications protocols.

17. The system of claim 16, wherein said means for providing said interworking function for processing said plurality of communications protocols further comprises:

means for providing a Code Division Multiple Access protocol stack for receiving a Code Division Multiple Access protocol signal;

means for providing a Time Division Multiple Access protocol stack for receiving a Time Division Multiple Access protocol signal; and means for providing data selector cards within said within said interworking function for processing said protocol stacks.

* * * * *

UNITED STATES PATENT AND TRADEMARK OFFICE
CERTIFICATE OF CORRECTION

PATENT NO.       : 6,618,384 B1
DATED            : September 9, 2003
INVENTOR(S)      : Stephen Bennett Elliott It is certified that error appears in the above-identified patent and that said Letters Patent is hereby corrected as shown below:

Column 4,
Line 11, delete "ESA" and insert -- IESA --.

Column 5,
Line 59, delete "ESA" and insert -- IESA --.

Column 8,
Line 32, delete the repeated phrase "within said."

Column 12,
Line 10, delete the repeated phrase "within said."

Signed and Sealed this

Second Day of March, 2004

JON W. DUDAS
*Acting Director of the United States Patent and Trademark Office*